UNITED STATES PATENT OFFICE 2,310,846

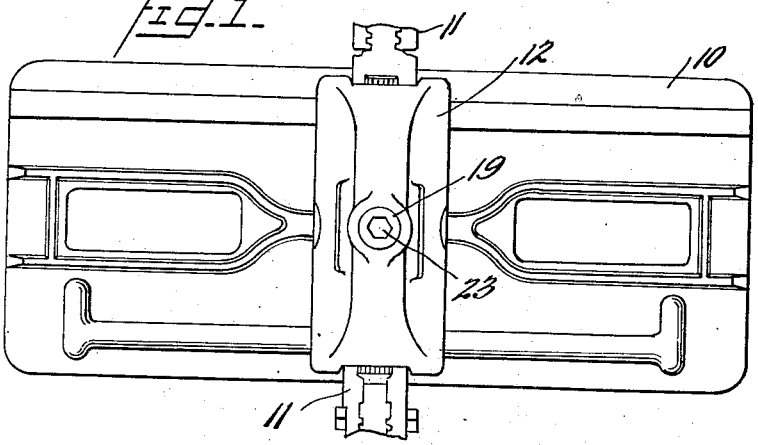
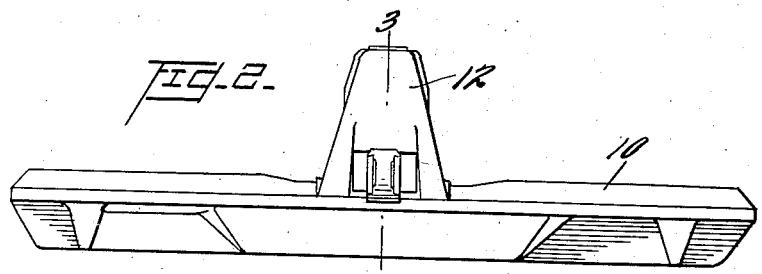
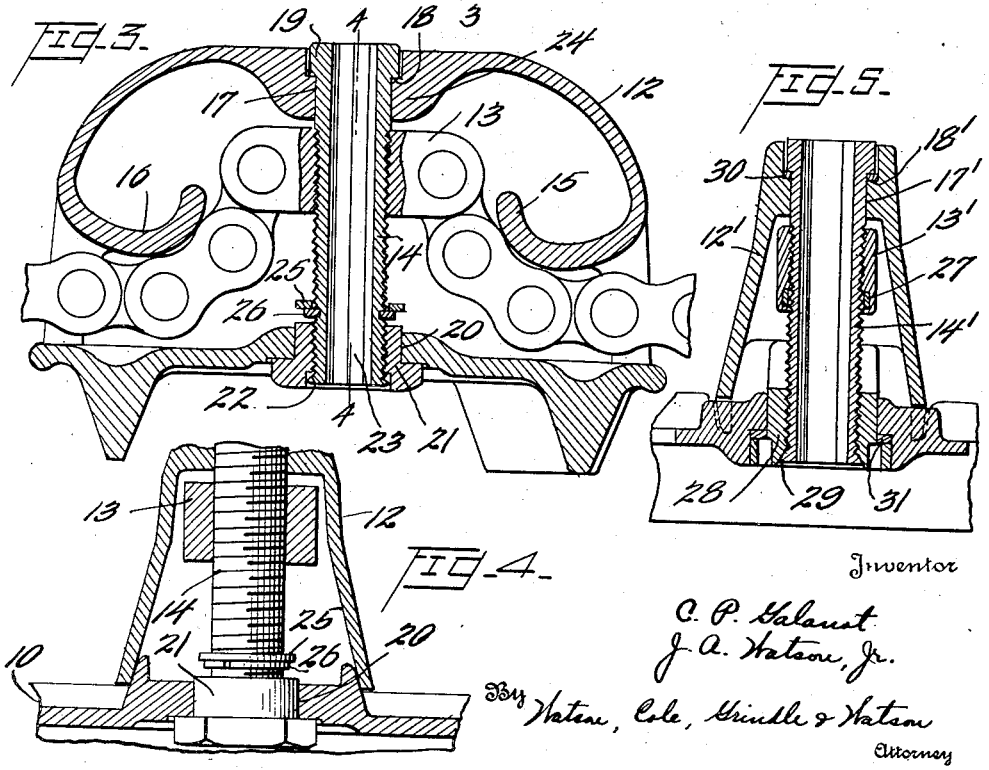
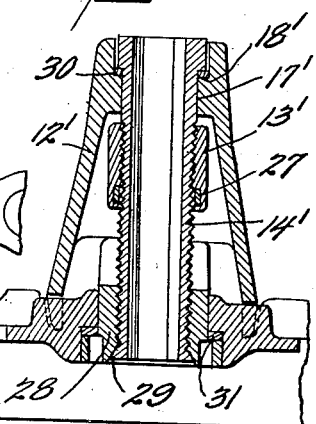

TRACTION DEVICE

Camille F. Galanot, Alliance, Ohio, and James A. Watson, Jr., Silver Spring, Md.

Application August 20, 1941, Serial No. 407,635

8 Claims. (Cl. 305—10).

This application relates to traction devices of the general type described in our copending application Serial No. 335,124, filed May 14, 1940, now Patent 2,273,950, granted February 24, 1942, and has for its general object the provision of improved means for guiding such traction devices relative to the wheels of the vehicle with which they may be associated, and improved means for adjusting the total length of such traction devices.

The traction device of our aforesaid copending application comprises in general a plurality of traction shoes secured at spaced intervals on a connecting member or belt which is adapted to extend around one or more wheels of a motor driven vehicle, particularly of the resilient tire type. In the traction device disclosed in the prior application, each traction shoe carries a hollow guide block, which guide blocks serve to maintain the traction device in proper alignment with the vehicle wheel or wheels, and also serve as housings for the adjusting means provided for varying the total length, and therefore the tightness, of the connecting belt.

It is an object of the present invention to provide a novel and advantageous form of hollow guide block for use with traction devices of the type described, which guide block exhibits increased efficiency in maintaining proper alignment of the traction device and also permits better distribution of the stresses to which the connecting belt is subjected, thereby extending the useful life of the latter.

It is a further object of the present invention to provide improved means for adjusting the length of the connecting member, whereby the necessary adjustment may be made in an extremely simple manner and without the necessity for removing any parts or elements of the device, which might thus be lost or misplaced.

A further object of the invention is the provision of a guide block which extends substantially the full breadth of the associated traction shoe in the direction of travel of the traction device, and which houses adjusting means comprising an adjusting block carried by the connecting belt, a rotatable member having threaded engagement with the said adjusting block, and simple but effective means for preventing inadvertent rotation of said member and hence, inadvertent loosening or tightening of the connecting belt.

Other and further objects, features and advantages of the present invention will be apparent to one skilled in the art from the following description taken in connection with the accompanying drawing in which:

Figure 1 is a plan view of a traction shoe and associated parts constructed in accordance with the present invention;

Figure 2 is a side elevation of the device of Figure 1;

Figure 3 is a section on line 3—3 of Figure 2;

Figure 4 is a fragmentary sectional view on line 4—4 of Figure 3; and

Figure 5 is a view similar to Figure 4 but illustrating a modified form of adjusting means for the connecting belt.

In order to facilitate an understanding of the invention, reference is made to the embodiment thereof shown in the accompanying drawing and detailed descriptive language is employed. It will nevertheless be understood that no limitation of the invention is thereby intended and that various changes and alterations are contemplated such as would ordinarily occur to one skilled in the art to which the invention relates.

Referring to Figure 1 the numeral 10 designates a traction shoe adapted for use in a traction device of the general type described in our above mentioned copending application, short portions of the connecting belt 11 being shown extending from beneath the hollow guide block 12. In the present embodiment, a traction shoe adapted for use with dual tire wheels is illustrated, and the guide block 12 is therefore disposed centrally of the traction shoe 10. As seen in Figure 2, the guide block 12 extends to a considerable height above the tire engaging surface of the traction shoe, the guide blocks 12 of at least several shoes being at all times engaged between the dual tires of the associated vehicle wheel, thereby maintaining the traction device in proper alignment. When the device is intended for use with single tire vehicles, the central guide block is replaced by two guide blocks disposed at the respective ends of the traction shoes, and two connecting belts are used.

Referring to Figure 4, it will be seen that the connecting belt 11, which is of the link type, includes a rigid link or adjusting block 13 which is provided with a threaded aperture for engagement with an adjusting bolt 14 which operatively interconnects the traction shoe, the guide block and the connecting belt. In earlier embodiments of such traction devices the guide block has customarily been made somewhat shorter (i. e., in the direction of travel) wherefore the guiding surfaces thereof were of lesser area than in the present embodiment. Also, the guide blocks of the previous embodiments have included fore and aft walls which extended vertically downward into engagement with the upper surface of the connecting belt, pressing the latter tightly against the associated traction shoe when the guide block was tightened down against the latter. While this arrangement has proven to be very satisfactory, it has been found that the clamping of the connecting belt between the guide block and the traction shoe has decreased the flexibility of the apparatus as a whole, and has also resulted in excessive wear of the connecting belt at the clamping points, due to the fact that in actual operation it was found that the belt was flexed only at such points.

In accordance with the present invention, the guide block is lengthed so as to extend throughout substantially the full breadth of the traction shoe, as seen in Figure 1, and the lower portions 15 and 16 of its fore and aft walls are curved inwardly to provide curved belt engaging surfaces of relatively large radius, the vertical distance between such surfaces and the traction shoe being greater than the thickness of the connecting belt, so that the latter is not in any sense clamped between the guide block and the shoe. As will readily be seen, this arrangement provides for the belt 11 a better distribution of stresses and of wear.

The guide block 12 is provided, centrally of its upper wall, with an aperture 17 which is enlarged adjacent the upper end thereof to provide a shoulder 18. The adjusting bolt 14 extends through the aperture 17 and is provided with an enlarged head 19 adapted to seat on the shoulder 18 of the guide block. The bolt 14 extends through the adjusting block 13, having threaded engagement therewith, and through an aperture 20 of the traction shoe, a lock nut 21 being threaded onto the lower end of the bolt 14 and being rotatively seated in the aperture 20. After the lock nut 21 is in place, the lower end of the bolt 14 is turned over as at 22 to prevent removal of the lock nut 21, while permitting limited movement thereof relative to the bolt 14. Preferably the latter is broached or otherwise machined to provide a non-cylindrical recess 23 extending partly or entirely therethrough in a lengthwise direction, for the reception of an operating tool.

From the foregoing description it will be obvious that the position of the adjusting block 13 relative to the bolt may be varied by rotating the latter, upward movement of the adjusting block 13 being limited by the enlarged boss 24 formed on the inside of the guide block, and downward movement of the adjusting block being limited by a stop washer 25 supported on a snap washer 26. In order to effect adjustment of the guide block, for the purpose of loosening or tightening the belt 11, it is only necessary to back off the lock nut 21 to a slight extent, then rotate the bolt 14 so as to raise or lower the guide block 13 as desired. The lock nut is then tightened, locking the bolt 14 against inadvertent rotation.

It will be apparent that the above described adjusting means may be operated in a very simple manner, and that its actuation does not involve the removal of any parts which might thus become lost or misplaced. Furthermore, there are no parts which may be completely removed in the field, intentionally or otherwise.

In the modification illustrated in Figure 5, somewhat different means are provided for preventing inadvertent rotation of the adjusting bolt 14'. In this case the adjusting block 13' is provided with a fiber or other friction washer 27 which is adapted to frictionally engage the threads of the bolt 14' in such a manner as to prevent the inadvertent rotation of the latter. It will of course be obvious that the adjusting block 13', being a part of the belt 11, is substantially non-rotatable relative to the traction shoe 10' and guide block 12'. The latter is substantially similar to the guide block 12 of Figures 1–4, and is provided with curved portions similar to 15 and 16 of Figure 3.

The lower end of the bolt 14' is provided with a bushing 28 in the form of a nut threaded thereon and rotatably seated in the traction shoe. The lower end of the bolt is turned over, as at 29, into a countersink formed in the nut 28, whereby the latter is substantially rigidly secured to the bolt, and rotates therewith. Since the present embodiment makes no provision for releasing the tension on the bolt 14', as by backing off the lock nut in the previous embodiment, it is preferable to provide bronze or other bushings 30 and 31 to take the thrust at the respective ends of the bolt 14'.

It will be appreciated that in both of the described embodiments, lateral walls of the guide block engage the upper surface of the traction shoe, and in the embodiment of Figure 5, this engagement is constant, whereas in the embodiment of Figure 4, the firm engagement of the guide block and traction shoe is slightly released while adjustments are taking place. In both cases, however, the guide block is permanently secured to the traction shoe, and may not be removed in the field. The modification of Figure 5 has the advantage that only a single tool and a single operation are required for making the described adjustment, whereas in the previous embodiment the lock nut 21 must be manipulated before and after rotation of the bolt 14.

In the case of the construction illustrated in Figure 5, in which the adjustment may be effected without modifying the relation between the guide block and the shoe, the latter two members may, if desired, be permanently secured together by means other than the adjusting screw, as by bolts or rivets, or they may be welded together, thus relieving a portion of the strain upon the adjusting screw.

From the foregoing description it will be apparent that the present invention provides a device accomplishing the purposes and possessing the advantages hereinbefore set forth.

Having thus described the invention, what is claimed as new and desired to be secured by Letters Patent is:

1. In a device of the character described, in combination, a belt, a traction shoe, a hollow guide block, and means for securing said belt, traction shoe and guide block together and for adjusting the relationship of said belt and said traction shoe, said last means comprising a threaded member rotatably mounted in said guide block and traction shoe and having threaded engagement with said belt, means preventing substantial longitudinal movement of said threaded member, and means for preventing accidental rotation of said threaded member, said threaded member having a tool engaging surface.

2. In a device of the character described, in combination, a belt, a traction shoe, a hollow guide block, and means for securing said belt, traction shoe and guide block together and for adjusting the relationship of said belt and said traction shoe, said last means comprising a threaded member rotatably mounted in said guide block and traction shoe and having threaded engagement with said belt, means preventing substantial longitudinal movement of said threaded member, and friction means acting between said threaded member and said belt for preventing accidental rotation of said threaded member, said threaded member having a tool engaging surface.

3. In a device of the character described, in combination, a belt, a traction shoe, a hollow guide block, and means for securing said belt, traction shoe and guide block together and for adjusting the relationship of said belt and said traction shoe, said last means comprising a threaded member rotatably mounted in said guide block and traction shoe and having threaded engagement with said belt, means preventing substantial longitudinal movement of said threaded member, and a friction washer carried by said belt and engaging said threaded member for preventing accidental rotation of said threaded member, said threaded member having a tool engaging surface.

4. In a device of the character described, in combination, a belt, a traction shoe, a hollow guide block, and means for securing said belt, traction shoe and guide block together and for adjusting the relationship of said belt and said traction shoe, said last means comprising a threaded member rotatably mounted in said guide block and traction shoe and having threaded engagement with said belt, and means preventing substantial longitudinal movement of said threaded member, said last means including a lock nut acting between said threaded member and said traction shoe for preventing accidental rotation of said threaded member, said threaded member having a tool engaging surface.

5. In a device of the character described, in combination, a belt, a traction shoe, a hollow guide block, and means for securing said belt, traction shoe and guide block together and for adjusting the relationship of said belt and said traction shoe, said guide block having side portions in engagement with said traction shoe and having belt-engaging surfaces curved in the direction of the length of said belt, said curvature being of relatively long radius and said surfaces being spaced from said shoe to a distance greater than the thickness of said belt.

6. In a device of the character described, in combination, a belt, a traction shoe, a hollow guide block, and means for securing said belt, traction shoe and guide block together and for adjusting the relationship of said belt and said traction shoe, said guide block having side portions in engagement with said traction shoe and having belt-engaging surfaces curved in the direction of the length of said belt, said curvature being of relatively long radius and said surfaces being spaced from said shoe to a distance greater than the thickness of said belt, said guide block and said shoe being of substantially the same dimension in the direction of the length of said belt.

7. In a device of the character described, in combination, a belt, a traction shoe, a hollow guide block, and means for securing said belt, traction shoe and guide block together and for adjusting the relationship of said belt and said traction shoe, said last means comprising a threaded member rotatably mounted in said guide block and traction shoe and having threaded engagement with said belt, said guide block having side portions in engagement with said traction shoe and having belt-engaging surfaces curved in the direction of the length of said belt, said curvature being of relatively long radius and said surfaces being spaced from said shoe to a distance greater than the thickness of said belt.

8. In a device of the character described, in combination, a belt, a traction shoe, a hollow guide block, and means for securing said belt, traction shoe and guide block together and for adjusting the relationship of said belt and said traction shoe, said last means comprising a threaded member rotatably mounted in said guide block and traction shoe and having threaded engagement with said belt, said guide block and said shoe being of substantially the same dimension in the direction of the length of said belt.

CAMILLE P. GALANOT.
JAMES A. WATSON, Jr.